United States Patent [19]

Harshberger et al.

[11] Patent Number: 5,311,397
[45] Date of Patent: May 10, 1994

[54] COMPUTER WITH MODULES READILY REPLACEABLE BY UNSKILLED PERSONNEL

[75] Inventors: Martin J. Harshberger, Collierville; Arthur R. Reader, Bartlett, both of Tenn.; Michael S. Giambrone, Schaumburg, Ill.

[73] Assignee: Logistics Management Inc., Memphis, Tenn.

[21] Appl. No.: 925,616

[22] Filed: Aug. 6, 1992

[51] Int. Cl.⁵ .................. H05K 7/10; H05K 7/14; H05K 7/20; G06F 1/16

[52] U.S. Cl. .................. 361/683; 361/686; 361/687; 361/693; 361/725; 361/726; 70/57; 439/299; 439/928

[58] Field of Search ......... 70/57, 58, 85, 86, DIG. 30, 70/379 R, 380; 439/299, 300, 374, 377, 378, 928, ; 361/380, 383, 386–396, 399, 417, 427, 429, 679–688, 690, 692, 693, 707, 709, 710, 714, 724–727, 807–810, 825, 829, 831; 364/708, 708.1; D14/100, 105, 107

[56] References Cited

U.S. PATENT DOCUMENTS

| | | | |
|---|---|---|---|
| 3,734,874 | 3/1978 | Hwang et al. | 364/708 |
| 4,084,250 | 4/1978 | Albertine et al. | 364/708 |
| 4,208,081 | 6/1980 | Kekas et al. | |
| 4,379,336 | 4/1983 | Yamamoto et al. | 364/708 |
| 4,388,671 | 6/1983 | Hall et al. | 361/383 |
| 4,471,442 | 9/1984 | Douglas et al. | 364/466 |
| 4,479,198 | 10/1984 | Romano et al. | 364/708 X |
| 4,501,460 | 2/1985 | Sisler | |
| 4,527,285 | 7/1985 | Kekas et al. | 455/607 |
| 4,530,066 | 7/1985 | Ohwaki et al. | 364/708 |
| 4,680,674 | 7/1987 | Moore | 361/395 |
| 4,725,244 | 2/1988 | Chewning et al. | 439/296 |
| 4,742,477 | 5/1988 | Phillips et al. | 364/708 |
| 4,769,764 | 9/1988 | Levanon | 364/708 |
| 4,772,759 | 9/1988 | Roy et al. | 361/383 X |
| 4,788,658 | 11/1988 | Hanebuth | 364/708 X |
| 4,841,412 | 6/1989 | Heys, Jr. et al. | 361/393 |
| 4,862,353 | 8/1989 | Williams | 364/708 X |
| 4,879,635 | 11/1989 | Collins et al. | 361/391 |
| 4,899,254 | 2/1990 | Ferchau et al. | 361/395 X |
| 4,918,572 | 4/1990 | Tarver et al. | 361/395 |
| 4,977,532 | 12/1990 | Borkowicz et al. | 364/708 |
| 5,036,313 | 7/1991 | Lin et al. | 340/700 |
| 5,038,308 | 8/1991 | Le et al. | 364/708 |
| 5,051,868 | 9/1991 | Leverault et al. | 361/395 |
| 5,159,533 | 10/1992 | Kuang | 361/391 |

*Primary Examiner*—Leo P. Picard
*Assistant Examiner*—Michael W. Phillips
*Attorney, Agent, or Firm*—Nies, Kurz, Bergert & Tamburro

[57] ABSTRACT

A computer assembly comprised of a plurality of modular units which are readily connectable by pluggable terminals to permit quick interchangeability and/or replacement of certain units by untrained and unskilled personnel. The computer assembly includes a docking bay module provided with a number of external connectors for connection to equipment such as a keyboard, printer, cash register, etc., and a power supply plug. A CPU module containing the logic circuitry is slidably mounted in and out of the docking bay module and is readily connected by mating pluggable terminals to the various equipment linked to the external connectors on the docking bay module. A peripheral bay module may be added to the docking bay and CPU modules to function as a file server station in a local area network environment. The CPU module is quickly and conveniently replaced by unskilled personnel for maintenance and repair purposes. The CPU module is constructed in such a way that cooling of the circuit components is accomplished without the presence of a cooling fan. Because the CPU module is quickly and easily replaced in the docking module by unskilled personnel, the customer need not maintain an inventory of spare parts but may rely on overnight delivery service from a maintenance contractor for a replacement CPU module.

23 Claims, 7 Drawing Sheets

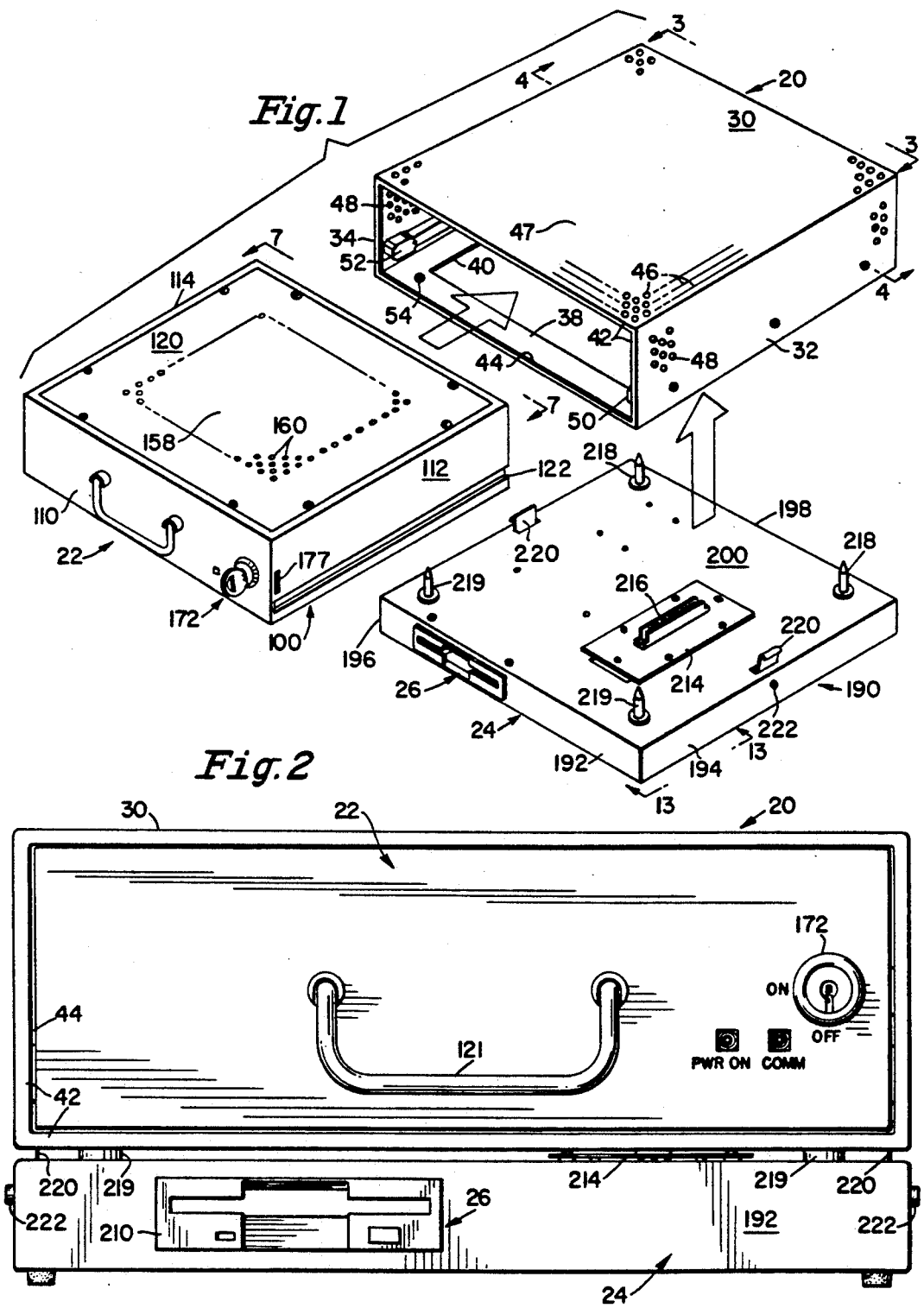

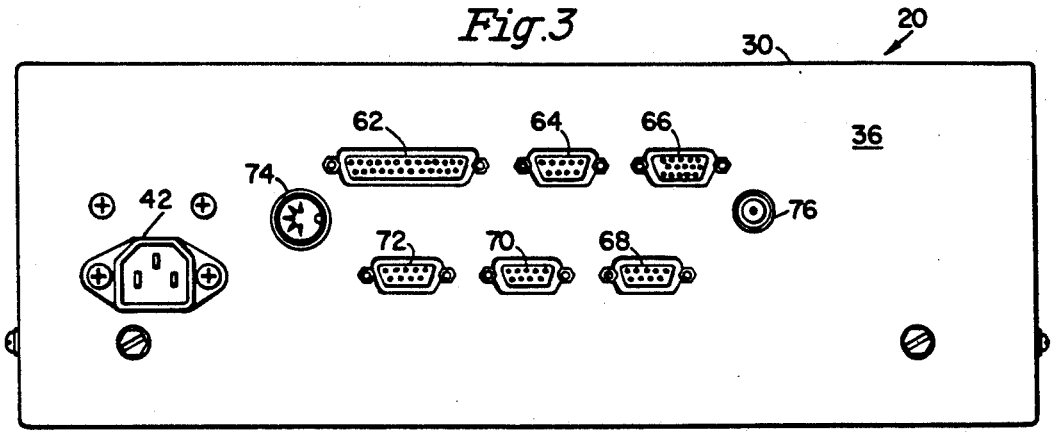
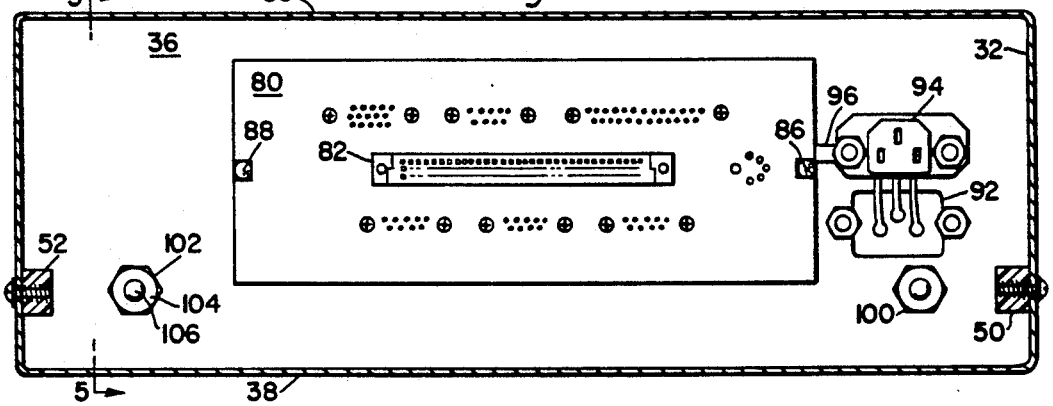
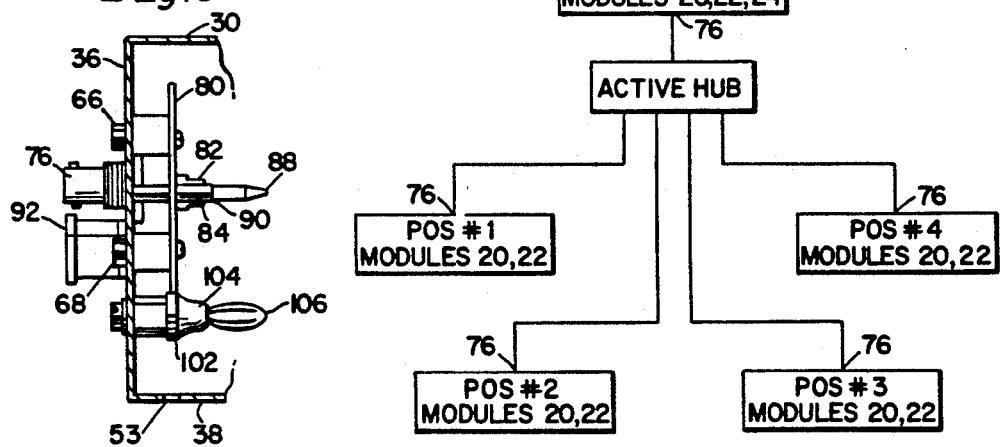

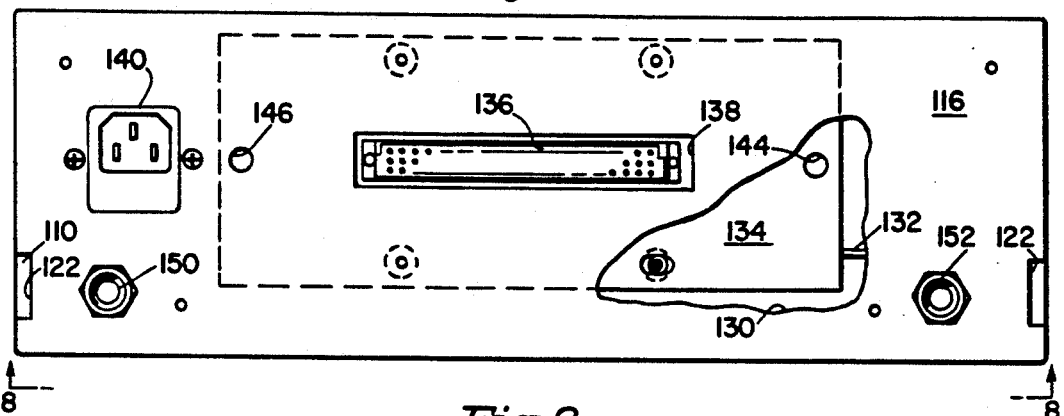
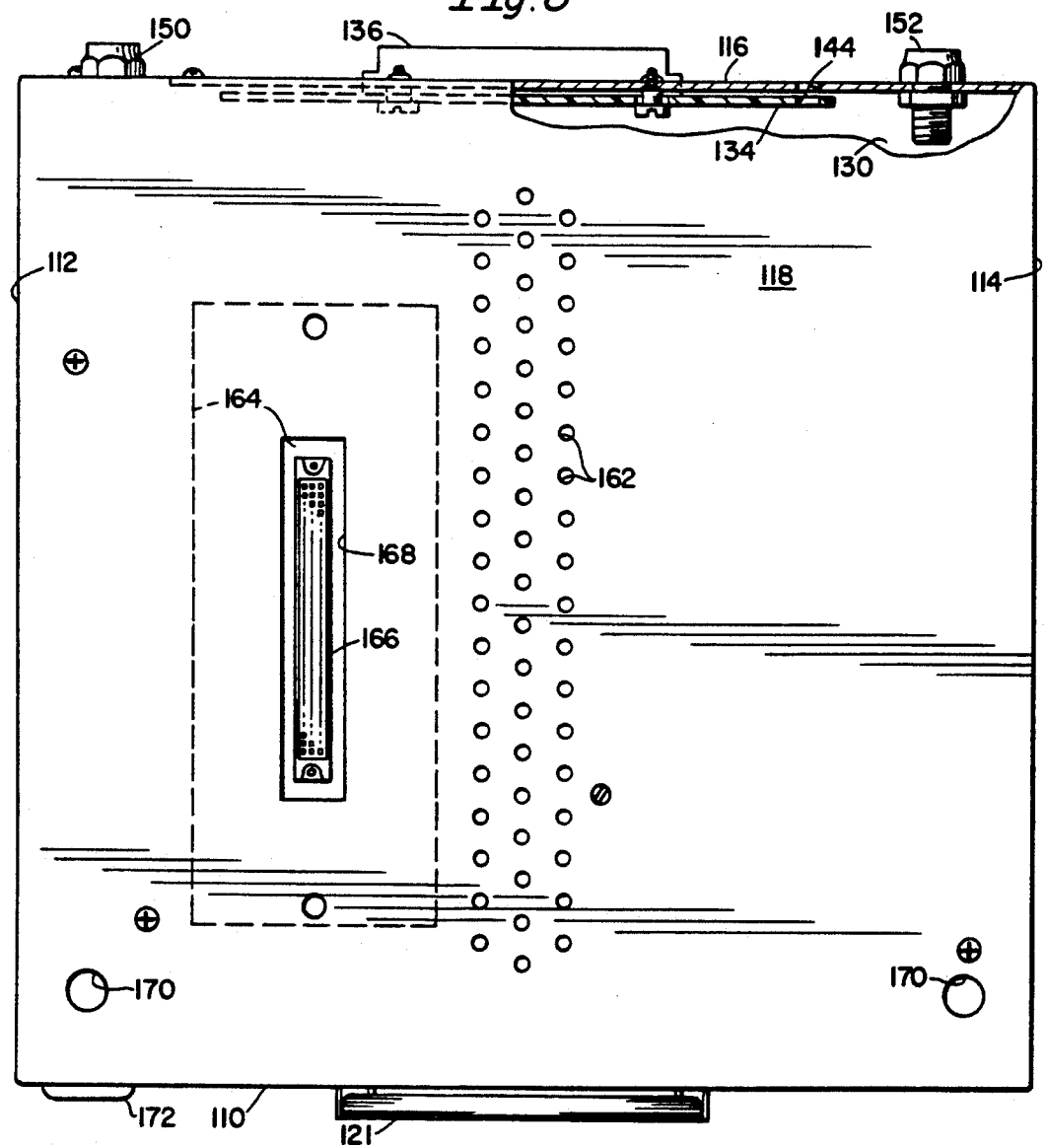

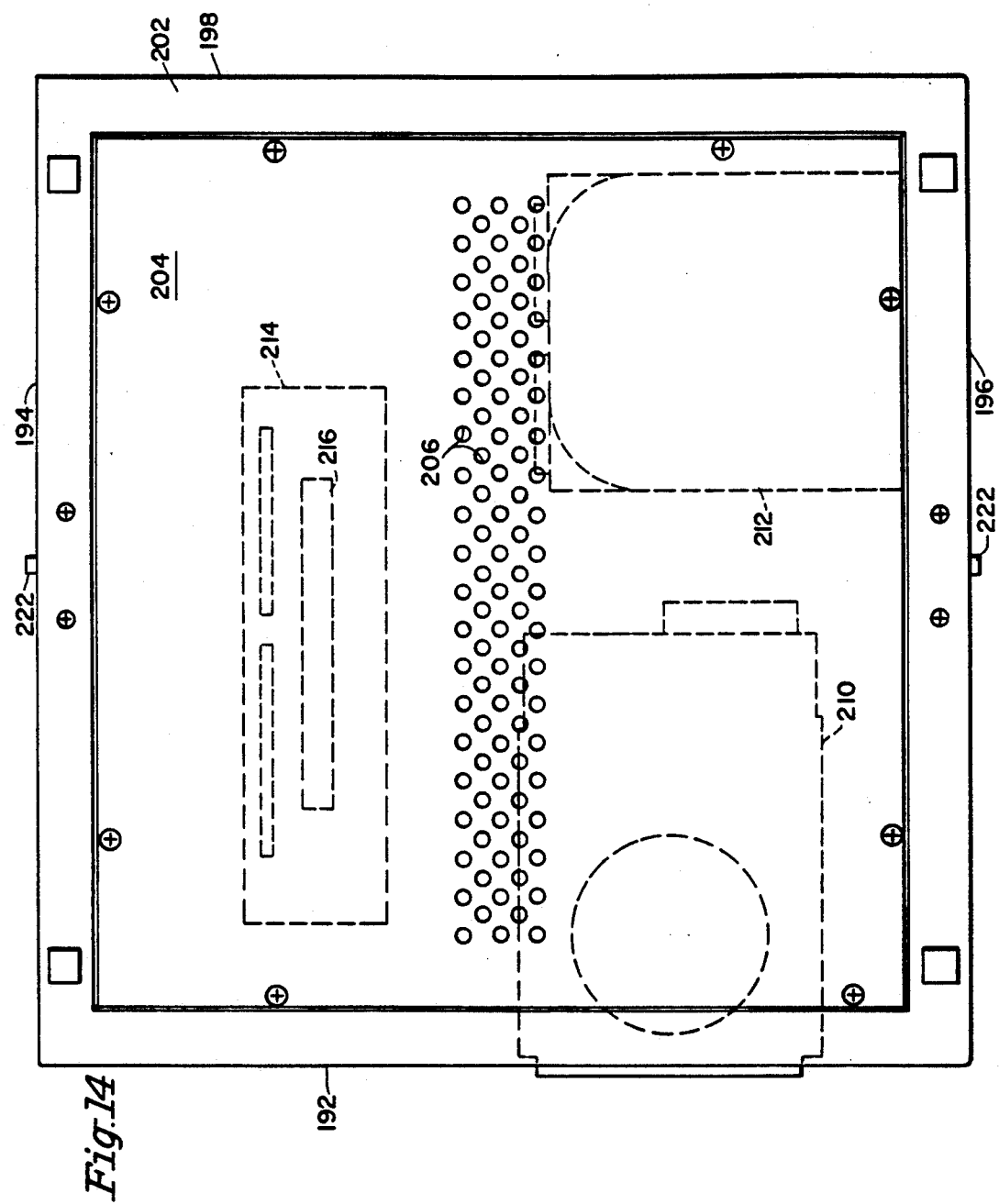

COMPUTER WITH MODULES READILY REPLACEABLE BY UNSKILLED PERSONNEL

BACKGROUND OF THE INVENTION

This invention relates generally to computer systems and, more particularly, to a novel computer system including a plurality of modular units which are readily connectable by pluggable terminals to permit quick interchangeability and/or replacement of certain units by untrained and unskilled personnel.

Conventional computer systems used in a local area network (LAN) environment, such as fast food restaurants, retail stores, airline desks, etc., often include a number of points of sale (POS) terminals or stations and a file server station serving those POS stations. To service and repair these systems, often the user is required to maintain an internal staff of skilled technicians together with an inventory of spare parts, both of which add up to a very substantial operating expense for the user. Alternatively, smaller users often rely upon independent contractors for on-site maintenance which is not only very expensive but quite often not very dependable and the systems encounter substantial downtime.

The prior art has addressed modularity in the personal computer area primarily in the direction of expansion, i.e., adding capability features or functions to a single machine. Typical proposals are illustrated in U.S. Pat. Nos. 4,734,874, 4,530,066, 4,918,572, and 4,527,285. Other proposals such as those disclosed in U.S. Pat. Nos. 5,036,313 and 4,388,671 address somewhat the repair and assembly of computer components. However, they do not focus primarily on maintenance and repair of computers in a LAN environment by unskilled personnel.

SUMMARY OF THE INVENTION

Accordingly, the primary object of this invention is to provide a novel computer system which lends itself to remote problem diagnosis and overnight parts exchange from supplier to user, the exchange parts then being quickly and easily installed by unskilled personnel so as to reduce cost and downtime to the user.

Another object of the invention is to provide the above novel computer system which comprises a plurality of modular components, including a central processing unit (CPU) module which may be used interchangeably from a single POS work station to a file server station in combination with a disk drive module.

Still another object of the invention is to provide the above novel computer system which comprises a docking bay module having a first centralized receptacle to which various input and output plugs are connected, a CPU module which is removably mounted within the docking bay module and includes a first centralized pin connector which is readily connected to the first receptacle when the CPU module is fully inserted into the docking bay module. When necessary for repair or replacement, the CPU module is quickly and conveniently removed from the docking bay module without necessitating removal of the docking bay module from its work station and without requiring disconnection of the various input and output plugs from the docking bay module.

A further object of the invention is to provide the above novel computer system wherein the CPU module includes a second centralized receptacle which is readily connectable to a second centralized connector on a peripheral bay module containing, for example, a disk drive unit, the peripheral bay module being readily connectable and removable from the docking bay module. Consequently, the docking bay module and the CPU module together may be used as a diskless POS work station, or with the addition of the peripheral bay module may be used as a disk file server.

A further object of the invention resides in the provision of the above novel computer system incorporated in a local area network (LAN), including a number of single diskless work stations at which a combined docking bay module and CPU module are located and a file server station at which a combined docking bay module, CPU module, and a peripheral bay disk drive module are located. The CPU module from a diskless station is interchangeable with the CPU module at the file server station so as to enhance the repair and serviceability of the computer system by untrained and unskilled personnel at the local area network.

A further object of the invention resides in the provision of the above-described computer system which enables an end user to quickly and easily perform self-maintenance via a remote problem diagnosis and overnight product exchange, utilizing a maintenance supplier's central parts management, distribution, depot repair and helpdesk capabilities. Because the CPU module is totally self-contained and quickly and easily removed from the docking bay module, the user needs only to contact the supplier when a problem is encountered and, if necessary, the supplier by an overnight delivery service will provide a replacement CPU module. The user by the same overnight delivery service will return the troublesome CPU module to the supplier for repair. Consequently, the end user's costs of on-site maintenance and parts inventory are substantially reduced.

Other objects and advantages of the invention will become apparent from reading the following detailed description of the invention in which reference is made to the accompanying drawings wherein like numerals indicate like elements.

BRIEF DESCRIPTION OF THE DRAWINGS

FIG. 1 is an exploded perspective view of the computer system of the invention and illustrates the docking bay module, the CPU module, and the peripheral bay module unassembled but ready for quick and easy assembly.

FIG. 2 is a front elevation view of the system with the docking bay module, the CPU module, and the peripheral bay module assembled together.

FIG. 3 is a rear elevation view of the docking bay module taken generally along line 3—3 of FIG. 1 illustrating the various cable plug connectors on the outside of the rear wall of the docking bay module.

FIG. 4 is a fragmentary sectional view taken along line 4—4 of FIG. 1 and illustrating the internal centralized receptacle on the inside of the rear wall of the docking bay module.

FIG. 5 is a fragmentary sectional view taken along line 5—5 of FIG. 4.

FIG. 7 is a rear elevational view of the CPU module taken generally along line 7—7 of FIG. 1.

FIG. 8 is a bottom plan view of the CPU module.

FIG. 14 is a bottom plan view of the peripheral bay module illustrated in FIG. 1.

FIG. 15 is a schematic drawing illustrating a LAN environment having a number of POS stations and a file server station serving those POS stations.

DETAILED DESCRIPTION OF THE INVENTION

Figure 6:
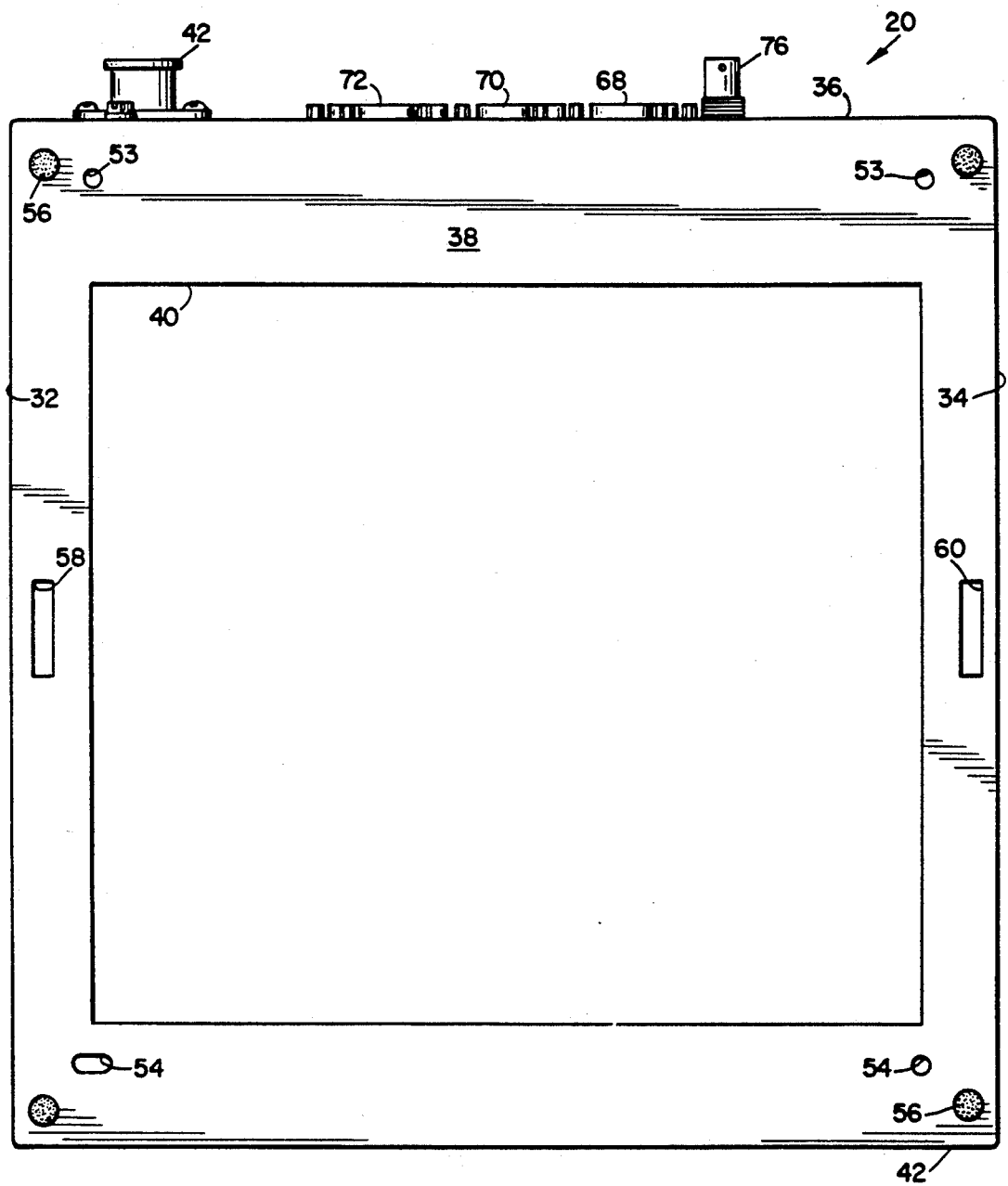
FIG. 6 is a bottom plan view of the docking bay module.
Figure 9:
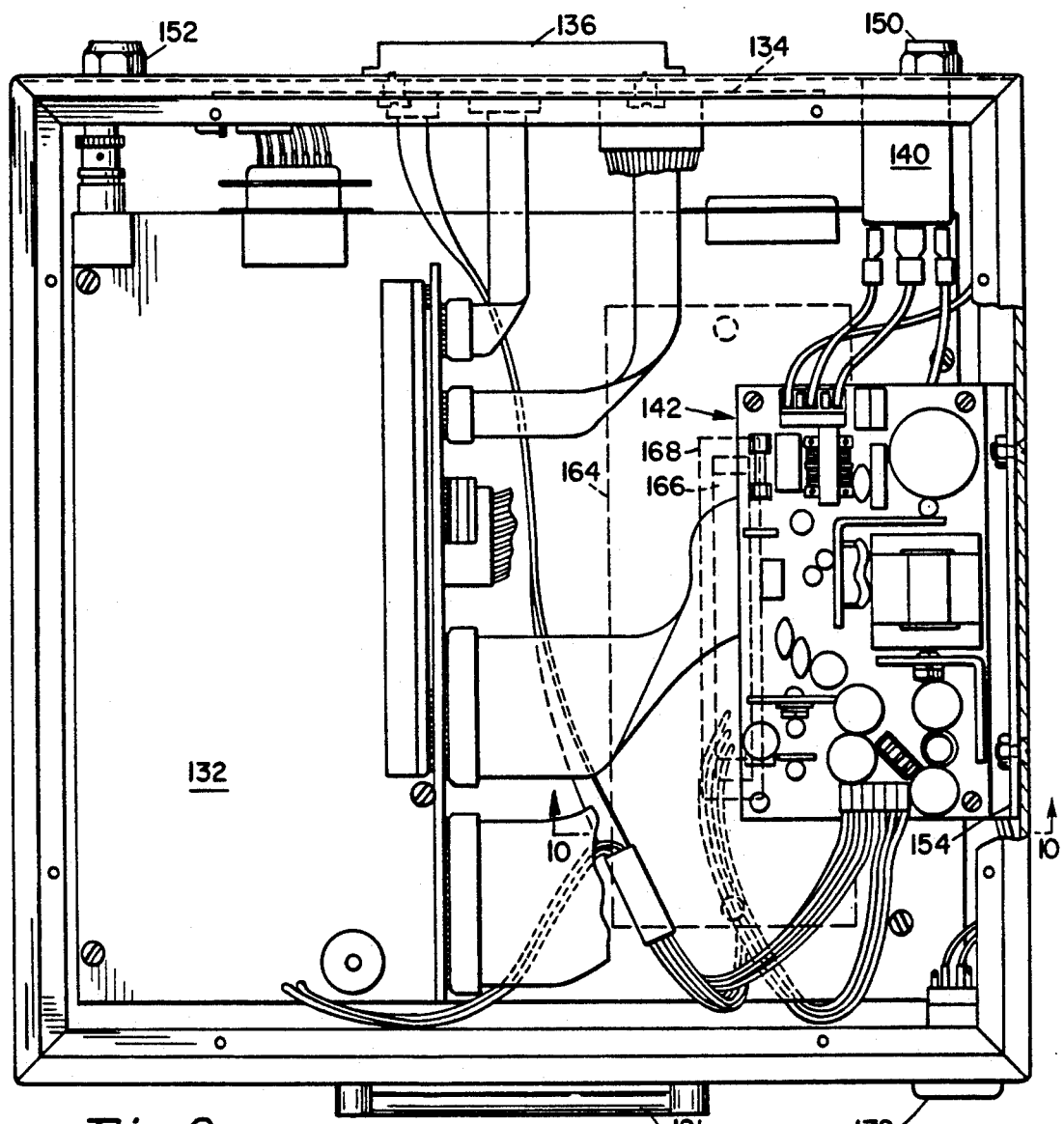
FIG. 9 is a fragmentary top plan view of the CPU module with the top cover removed.
Figure 10:
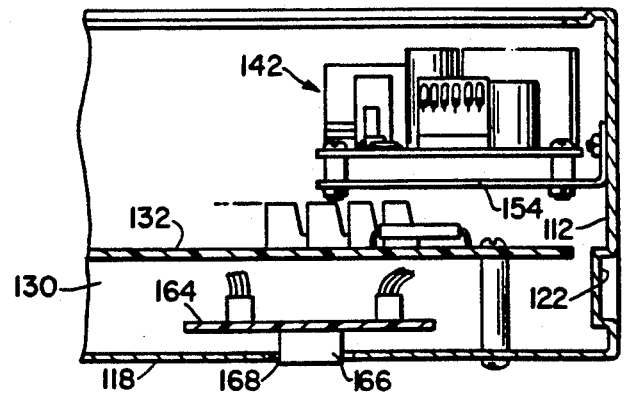
FIG. 10 is a fragmentary sectional view taken along line 10—10 of FIG. 9.

Referring now to FIGS. 1 and 2 of the drawings, the computer system of the invention includes a docking bay module 20, a central processing unit (CPU) module 22 which is readily insertable into and removable from module 20, and a peripheral bay module 24 which is readily connectable and removable from the bottom of modules 20 and 22.

In a LAN environment there may be several POS work stations at which a docking bay module 20 and CPU module 22 are mounted to service the equipment at that particular work station, such as a keyboard, a monitor, a printer, a cash register, etc. In addition, there may be a central file server station coordinating information to and from the various POS work stations, and the unit at the file server station will include the docking bay module 20, the CPU module 22, and the additional peripheral bay module 24 which incorporates one or more disk drive assemblies by which information is provided to and received from the CPU module 22.

Referring now to FIGS. 1–6, docking bay module 20 includes a rectangular aluminum housing 28 formed by a top wall 30, vertical side walls 32 and 34, rear wall 36, and bottom wall 38, provided with a rectangular opening 40 of substantial size. A peripheral flange or lip 42 extends around the front of walls 30, 32, 34, and 38 to define a rectangular front opening 44 through which the CPU module 22 enters for mounting in bay module 20. A series of rows of openings 46 extend around the peripheral area of top wall 30 leaving a central area 47 solid. Similarly, a series of rows of openings 48 extend from front to back on each of side walls 32 and 34.

Figure 11:
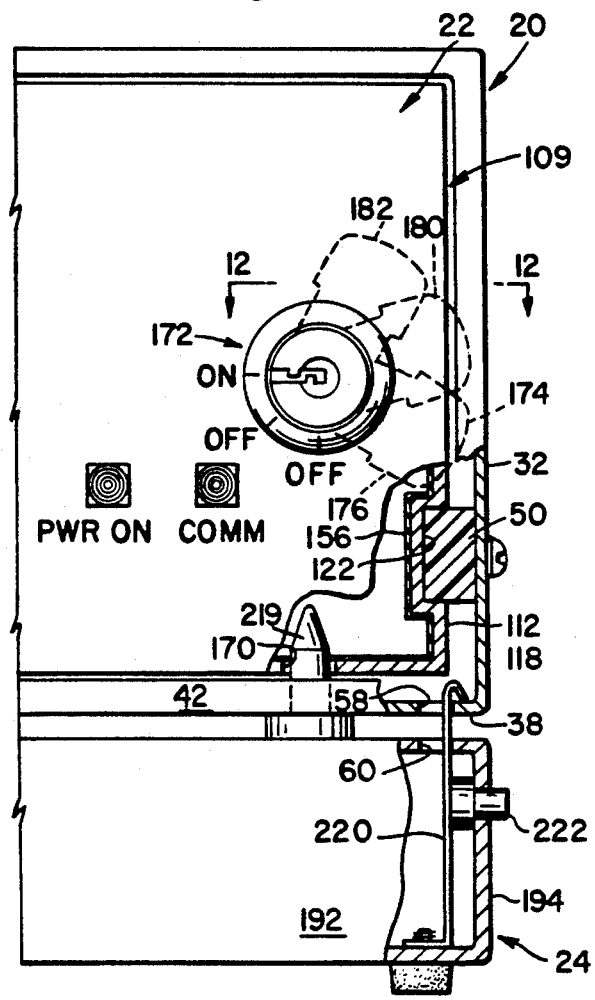
FIG. 11 is an enlarged fragmentary front elevational view partially broken away to illustrate certain details of the modules.

A pair of guide rails 50 and 52 are mounted respectively on the inside surface of side walls 32 and 34 below the vertical center line of the side walls (FIGS. 4 and 11).

The bottom wall 38 at the corner areas is provided with rear openings 53 and front openings 54 and thin rubber pads 56. In the center portion, adjacent side walls 32 and 34, the wall is furnished with latching slots 58 and 60.

Referring now to FIGS. 3, 4, and 5, a number of connectors 62, 64, 66, 68, 70, 72, 74, and 76 are fixed on the back of rear wall 36 to receive cables leading to various equipment. For example, connector 62 is a parallel connector for connection to a printer. Connectors 64, 68, 70, and 72 are serial connectors for connection to components such as a cash register, disk drive unit, badge reader, etc. A monitor may be attached to connector 66, and a keyboard may be attached to connector 74. Connector 76 is a network connector by which the POS stations are connected to a file server station.

All of the receptacles 62–76 extend through wall 36 and are connected to a common circuit board 80 which is spaced inwardly from the inside surface of wall 36. The various circuits on board 80 are all connected to a common 96-pin female receptacle 82 facing toward the front opening 44 of module 20. Board 80 is a multi-layer laminated board containing copper sheeting to maximize shielding and to prevent the transfer of interference. The layout of the various pins is designed to prevent interference and cross talk between the various signals being transmitted through the receptacle.

A pair of guide pins 84 and 86 are connected to board 80 in horizontal alignment with pin receptacle 82 and have turned circular portions 88 which provide a stop shoulder 90 that ensures proper alignment and connection between receptacle 82 and the mating 96-pin plug on the CPU module. Pins 84 and 86 also provide a ground connection for the circuitry on board 80. This also prevents the transfer of noise and interference and provides for maximum safety protection.

A male power supply plug 92 is mounted on the back face of wall 36 and is electrically connected to a female receptacle 94 mounted on the inside surface of wall 36 and also facing front opening 44 of module 20. Pins 84 and 86 are connected to a ground terminal within receptacle 94 via line 96.

A pair of laterally spaced guide pins 100 and 102 extend forwardly from the inside surface of wall 36 in general horizontal alignment with tracks 50 and 52. Each of pins 100 and 102 includes a contoured seat section 104 and a resilient spring finger section 106.

As illustrated in FIGS. 1 and 7–12, the CPU module 22 comprises an aluminum housing 109 formed by a front wall 110, side walls 112 and 114, rear wall 116, bottom wall 118, a removable top cover 120, and a handle 121 on wall 110. Each of the side walls 112 and 114 below its vertical center line is provided with a channel 122 which engages the guide rails 50 and 52 to slide module 22 in and out of module 20. Because the rails 50 and 52 and channels 122 are offset below the vertical center line, module 22 can only be inserted into module 20 in its proper operating position and cannot be inadvertently inserted in an upside down position.

The walls of the housing define a rectangular chamber 130 in which a mother-board 132 is mounted, the board containing the logic circuitry by which the various desired functions of the system may be performed. Mother-board 132 is electrically connected to a vertical panel board 134 mounted on the inside surface of rear wall 116 and having a 96-pin male connector 136 projecting outwardly through an opening 138 in wall 116 beyond the outside surface of wall 116. Connector 136 establishes a pluggable connection with the female receptacle 82 in module 20 to establish the various serial and parallel connections between the mother-board 132 and the various equipment connected to the receptacles 62–76 at the back of rear wall 36 of module 20. A male plug 140 is fixed inside wall 116 and mates with the female plug 94 on the inside of wall 36 to establish the power supply connection to a power supply unit 142 for the CPU module 22.

Wall 116 and panel board 134 are provided with aligned openings 144 and 146 which slide over the turned sections 88 of guide pins 84 and 86 to ensure proper alignment and connection between pin connector 136 and receptacle 82. In addition, a pair of guide bushings 150 and 152 are fixed to wall 116 and slide over the resilient fingers 106 onto seats 104 to help in properly positioning connector 136 and receptacle 82. With bushings 150 and 152 fully seated on seats 104, fingers 106 expand and hold the CPU module 22 in place within module 20.

Power supply unit 142 is mounted and arranged in compact fashion on an L-shaped aluminum bracket 154 which is fixed against side wall 112. During operation heat generated by the power unit 142 is absorbed by bracket 154 and conducted to side wall 112. The aluminum housing 109 of module 22 acts as a heat sink for the heat generated by the power supply unit 142 and the circuitry on board 132. To enhance the heat absorbing capabilities of housing 109, the interior surfaces of the walls of the housing are coated with a black heat-conductive paint 156 (FIG. 11), such as a black conductive paint identified as CONDUTRED II black conductive urethane manufactured by Rocktred Company, Skokie, Ill. Further, mother-board 132 utilizes CMOS low power, low temperature logic circuit components to reduce the amount of heat generated during use.

In addition, the central area 158 of cover 120 is provided with a plurality of openings 160 and the bottom wall 118 is provided with a plurality of openings 162 so as to permit convective air flow through housing 109. It should also be noted that natural convective air flow occurs in module 20 through side openings 48 and top openings 46 to cool the module 22. When the CPU module is in place within the bay module 20, the solid central panel area 47 of wall 30 overlies the perforated area 158 of cover 120 and thereby prevents any foreign materials such as food or liquids from spilling into housing 109. The location and mounting of the power supply unit 142 on wall 112, the heat absorbing and conducting capabilities of aluminum housing 109, and the convective air flow through and around housing 109 all assist in cooling CPU module 22 during operation. No separate cooling fan is needed and this is a significant advantage. In conventional systems a cooling fan is often a high failure item and is prone to draw foreign material into the unit. Elimination of the fan and its accompanying problems is very beneficial.

Also connected to the inside surface of bottom 118 is a circuit panel board 164 having a 96-pin female receptacle 166 accessible through a rectangular opening 168 in wall 118 to engage with a mating 96-pin connector on peripheral bay module 24. Board 64 suitably electrically connects module 24 to power unit 142, board 132, and plug 136.

A pair of openings 170 at the front of wall 118 align with openings 54 in wall 38 when module 22 is fully seated in module 20.

CPU module 22 is inserted into docking bay module 20 by aligning channels 122 with rails 50 and 52 and pushing module 22 inwardly. As rear wall 116 of housing 109 approaches rear wall 36 of module 20, spring fingers 106 enter guide bushings 150 and 152 and the turned sections 88 of guide pins 84 enter openings 144 and 146 with a snug fit so that the pins on connector 136 properly align with the female openings in receptacle 82 and the prongs in plug 140 are properly aligned with the openings in socket 94. Housing 109 is given one final push rearwardly until bushings 150 and 152 are fully seated on seat areas 104 and shoulders 90 on pins 84 engage against the outside surface of wall 16 surrounding openings 144 to stop any further movement of module 22 and prevent any damage to connector 136 and receptacle 82. The resilient fingers 106 frictionally engage within bushings 150 and 152 and help to retain module 22 in place within module 20.

Figure 12:
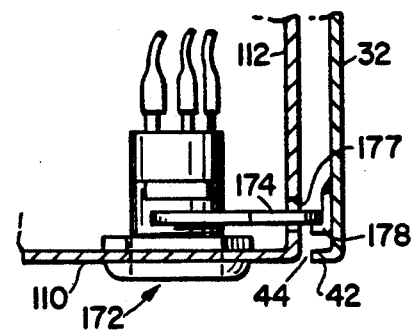
FIG. 12 is a fragmentary sectional view taken along line 12—12 of FIG. 11 illustrating the combined key operated switch and latch mechanism.
Figure 13:
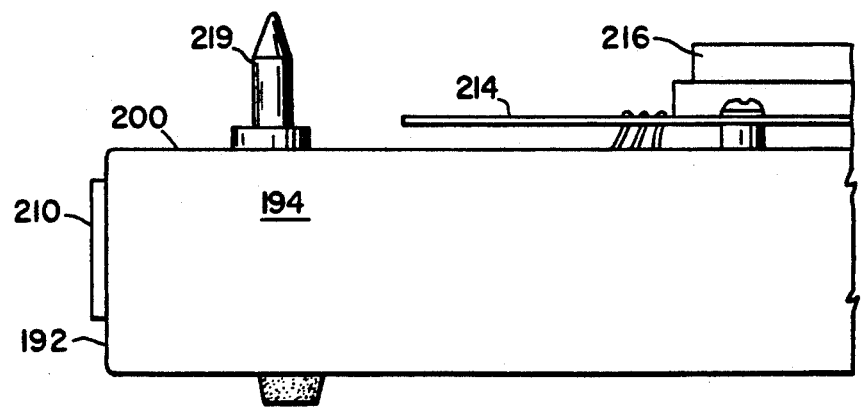
FIG. 13 is a fragmentary side elevation view of the peripheral bay module taken generally line 13—13 of FIG. 1.

As illustrated in FIGS. 2, 11, and 12, when CPU module 22 is in place within module 20 an air space exists completely around the walls of housing 109 to enhance convective air flow between the walls of the modules which assists in cooling module 22.

A combination key operated lock and switch assembly 172 is fixed to the front wall 110 of housing 109 and is movable between three positions. Switch assembly 172 is suitably electrically connected to the power supply unit 142 and logic circuitry to turn the CPU module on and off. Switch 172 includes a latch 174 which, when the switch is "on," is in a closed position 176 where it extends through a slot 177 and engages against a keeper 178 fixed against the inside surface of wall 32. In this position full power is supplied to the CPU module 22. When switch 172 is rotated counterclockwise 45 degrees from the "on" position, latch 174 is rotated to a second position 180 where it is still locked against keeper 178 but with the power "off." to In this way the computer may be turned off and the key removed from switch 172, but latch 174 remains locked against keeper 178 to prevent inadvertent removal of module 22 from bay module 20.

Finally, switch 172 may be turned from its "on" position 90° counterclockwise to an "off" position wherein latch 174 is located at a position 182 in which latch 174 is totally disengaged from keeper 178. In this "off" position there is no power being supplied to the CPU module 22 and module 22 may be moved from module 20 by pulling outwardly on handle 121.

The combination switch and latch assembly may be of the type commercially available as part number LD3181 from Illinois Lock Company, Wheeling, Ill.

Providing the combination switch and lock assembly 172 eliminates plugging and unplugging CPU module 22 while powered up, thereby preventing damage to the internal logic of the unit and possible injury to the user. When switch assembly 172 is turned to its "on" position from either of its "off" positions, it also re-boots the computer to its functional state.

Referring now to FIGS. 1, 2, 11, 13, and 14, peripheral bay module 24 includes an aluminum housing 190 having a front wall 192, side walls 194 and 196, rear wall 198, top wall 200, and bottom wall 202 provided with a removable cover panel 204 having a plurality of openings 206 in the central area thereof.

A floppy disk drive assembly 26 is mounted within housing 190 and includes the disk turntable unit 210 accessible from front wall 192, with unit 210 being electrically connected to hard drive unit 212 and a panel board 214 mounted on the upper surface of top wall 200, with the circuitry of board 214 being connected to an upwardly-extending 96-pin male connector 216 which is adapted to mate with receptacle 166 on module 22. Additional hard drive units may be provided within module 24.

When connecting the peripheral bay module 24 to the bottom of docking bay module 20, upwardly-extending guide pins 218 and 219 enter openings 53 and 54, respectively, with a close sliding fit to ensure that the male connector 216 properly engages with the female receptacle 166 on the bottom of module 22. Front pins 219 also enter openings 170 in wall 118 of module 22 (FIG.

11) and act as stop means to prevent module 22 from being removed from module 20 when connector 216 is engaged with the receptacle 166, thereby preventing damage to the connector and receptacle.

A pair of spring latch members 220 enter slots 58 and 60 and engage against the adjacent portion of bottom wall 38 of module 20 (FIG. 11) to hold modules 20 and 24 together. To remove module 24 from the bottom of module 20, the user need only push inwardly against a pair of push buttons 222 so that the upper ends of latches 220 may pass downwardly through slots 58 and 60.

In the assembled position illustrated in FIG. 2, the disk drive assembly 26 is properly electrically connected via pin connector 216 and receptacle 166 to power unit 142, pin connector 136, and the logic board 132. With the addition of module 24 the combined modules 20, 22, and 24 may act as a file server station under the control of information provided by the floppy disk placed into disk drive assembly 26.

From the description hereinabove, it is apparent that the modular computer of the invention may be conveniently used in a LAN environment. There may be a number of POS work stations at each of which the docking bay module 20 containing a CPU module 22 may be conveniently mounted in either a horizontal or vertical position with various desired auxiliary components attached to the plugs and receptacles on the outside face of wall 36. In addition, modules 20 and 22 may be used together with the peripheral bay module 24 to function as a main file server controlled by the disk drive assembly 26. The POS stations and file server station are properly linked together by network connectors 76 as shown in FIG. 15. The CPU 22 used at each of the diskless POS work stations is the same as the CPU module used in conjunction with the peripheral bay module 24 at the file server station. Consequently, if the CPU module in the file server fails, a CPU module from a single work station can be quickly and easily exchanged with it by untrained and unskilled personnel. Thus, the system will continue to operate and only one single diskless work station will be down until a replacement CPU module 22 is received.

In a LAN environment when a user encounters a failure problem at one of the work stations, the user need only contact the supplier or maintenance contractor at a remote office location. If the problem cannot be diagnosed and repaired from the remote station, the contractor will simply forward by overnight delivery service, such as Federal Express, a replacement CPU module 22. The next morning the user then merely removes the troublesome module 22 from its associated docking bay module 20 and replace it with the new module 22. All of this is done as described above because of the single pluggable connection between pin connector 136 and receptacle 82. The disabled CPU module 22 is then returned by the same overnight delivery service to the maintenance contractor for repair. The same overnight service procedure applies to replacement of a disk drive module 24 which is quickly and easily disconnected from module 22 merely by unplugging pin connector 216 from receptacle 166.

Because of their aluminum construction the modules are all lightweight and strong enough to withstand handling by a customer's personnel and to minimize shipping costs as part of the overnight express maintenance program. In addition, as already mentioned, the aluminum provides for maximum transfer of heat generated within the CPU module 22 and eliminates the need for a separate cooling fan.

Because the modules are quickly assembled and disassembled by untrained and unskilled personnel, the customer experiences a substantial savings in labor costs. In addition, the customer relies upon the maintenance contractor to provide the replacement components and thus reduces or totally eliminates any inventory costs for spare parts.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A computer assembly comprising a docking bay module including a first housing having a rear wall and a front opening, a plurality of connectors mounted on said rear wall and adapted to be connected to functional components which are separate from and external of the docking bay module, a circuit panel board mounted within said first housing adjacent said rear wall and having first pluggable connector means mounted thereon, said plurality of connectors being connected to said circuit panel board and said first pluggable connector means, a CPU module including a second housing and logic means mounted within said second housing, said second housing having a rear wall, second pluggable connector means mounted on said rear wall of said second housing and connected to said logic means, power supply connector means mounted on said rear wall of said first housing, said CPU module including a power supply unit mounted in said second housing and connected to said logic means, third pluggable connector means connected to said power supply unit, means for removably mounting said second housing through said front opening into said first housing so that said first and second pluggable connector means are coupled together and said third pluggable connector means is coupled with said power supply connector means.

2. The computer assembly according to claim 1, said docking bay and said CPU modules including cooperating guide means which ensure proper alignment of said first and second pluggable connector means as they are coupled together.

3. The computer assembly according to claim 1, said second housing having a front wall, a combination switch and latch means mounted on said front wall and electrically connected to said power supply unit, said combination switch and latch means having an "on" position in which power is supplied to said power supply unit and in which said second housing is latched against removal from said first housing, said combination switch and latch means having an "off" position in which no power is supplied to said power supply unit and in which said second housing is unlatched for removal from said first housing.

4. The computer assembly according to claim 3, said combination switch and latch means having a second "off" position in which no power is supplied to said power supply unit but in which said second housing is latched against removal from said first housing.

5. The computer assembly according to claim 1, said second housing having metallic walls, bracket means mounting said power supply unit from one of said walls and transferring heat away from said power supply unit to said one wall.

6. The computer assembly according to claim 5, the walls of said second housing being coated with a heat conducting coating to thereby cool said logic means and said power supply unit.

7. The computer assembly according to claim 1, said first housing having a top wall and side walls connected to said rear wall, said top wall having a solid central area surrounded by a peripheral area provided with a plurality of openings, said second housing including a top wall having a perforated central area surrounded by a solid peripheral area, the openings affording cooling air flow during use of the computer assembly, and the solid central area overlying the perforated central area to restrict contamination of the logic means within the second housing.

8. The computer assembly according to claim 7, comprising a plurality of openings extending along the side walls of said first housing.

9. The computer assembly according to claim 1, said CPU module having fourth pluggable connector means connected to said logic means, a peripheral module including a housing containing a disk drive assembly and fifth pluggable connector means connected to said disk drive assembly, second mounting means for removably mounting said peripheral module together with said docking module and said CPU module so that said fourth and fifth pluggable connector means are coupled together to connect said disk drive assembly to said logic means.

10. The computer assembly according to claim 9, said second mounting means including stop means for preventing removal of said second housing from said first housing while said fourth and fifth pluggable connector means are coupled together.

11. The computer assembly according to claim 10, said second mounting means including releasable latch means for holding said peripheral module and said docking module together.

12. A computer assembly comprising a docking bay module including a first rectangular housing having a top wall, side walls, a rear wall, a bottom wall, and a front opening, a plurality of connectors mounted on said rear wall and adapted to be connected to functional components which are separate from sand external of the docking module, a circuit panel board mounted within said first housing adjacent said rear wall and having first pluggable connector means mounted thereon, said plurality of connectors being connected to said circuit panel board and said first pluggable connector means, a CPU module including a second rectangular housing having a top wall, side walls, a front wall, a rear wall, and a bottom wall, logic means mounted within said second housing, second pluggable connector means mounted on said rear wall of said second housing and connected to said logic means, power supply connector means mounted on said rear wall of said first housing, said CPU module including a power supply unit mounted in said second housing and connected to said logic means, third pluggable connector means mounted in said second housing and connected to said power supply unit, means for removably mounting said second housing through said front opening into said first housing so that said first and second pluggable connector means are coupled together and said third pluggable connector means is coupled with said power supply connector means.

13. The computer assembly according to claim 12, said docking bay and said CPU modules including cooperating guide means which ensure proper alignment of said first and second pluggable connector means and said third pluggable connector means and said power supply connector means as they are coupled together.

14. The computer assembly according to claim 13, said CPU module having a combination switch and latch means mounted on said front wall of said second housing and electrically connected to said power supply unit, said combination switch and latch means having an "on" position in which power is supplied to said power supply unit and in which said second housing is latched against removal from said first housing, said combination switch and latch means having an "off" position in which no power is supplied to said power supply unit and in which said second housing is unlatched for removal from said first housing.

15. The computer assembly according to claim 14, said combination switch and latch means having a second "off" position in which no power is supplied to said power supply unit but in which said second housing is latched against removal from said first housing.

16. The computer assembly according to claim 13, said second housing being metal, bracket means mounting said power supply unit from one of said walls and transferring heat away from said power operating assembly to said one wall.

17. The computer assembly according to claim 16, the walls of said second housing being coated with a heat conducting coating to thereby cool said logic means and said power supply unit.

18. The computer assembly according to claim 17, the top wall of said first housing having a solid central area surrounded by a peripheral area provided with a plurality of openings, the top wall of said second housing having a perforated central area surrounded by a solid peripheral area, the openings affording cooling air flow during use of the computer assembly, and the solid central area overlying the perforated central area to restrict contamination of the logic means within the second housing.

19. The computer assembly according to claim 18, comprising a plurality of openings extending along the side walls of said docking module housing.

20. The computer assembly according to claim 12, said CPU module having fourth pluggable connector means mounted on said bottom wall of said second housing and connected to said logic means, a peripheral module including a third rectangular housing containing a disk drive assembly and having a top wall mounting a fifth pluggable connector means connected to said disk drive assembly, second mounting means for removing mounting said peripheral module on the bottom of said docking module and said CPU module so that said fourth and fifth pluggable connector means are coupled together to connect said disk drive assembly to said logic means.

21. The computer assembly according to claim 20, said second mounting means including stop means for preventing removal of said second housing from said first housing while said fourth and fifth pluggable connector means are coupled together.

22. The computer assembly according to claim 21, said second mounting means including releasable latch means for holding said peripheral module and said docking module together.

23. A computer network comprising first and second computer assemblies, said first computer assembly comprising a first docking bay module including a housing having a rear wall and a front opening, a plurality of connectors mounted on said rear wall and adapted to be connected to functional components which are separate from and external of the docking bay module, a circuit panel board mounted within said housing adjacent said rear wall and having first pluggable connector means mounted thereon, said plurality of connectors being connected to said circuit panel board and said first pluggable connector means, power supply connector means mounted on said rear all of said first housing, a first CPU module including a second housing and a logic means mounted within said second housing, said second housing having a rear wall, second pluggable connector means mounted on said rear wall and connected to said logic means, a power supply unit mounted in said second housing and connected to said logic means, third pluggable connector means mounted on said second housing and connected to said power supply unit, means for removably mounting said second housing through said front opening into said first housing so that first and second pluggable connector means are coupled together and said third pluggable connector means is coupled with said power supply connector means, said first CPU module having fourth pluggable connector means connected to said logic means;

said second computer assembly including a second docking bay module and a second CPU module substantially identical to said first docking bay and CPU modules, respectively, said second computer assembly further including a peripheral module having a housing containing a disk drive assembly and fifth pluggable connector means connected to said disk drive assembly, second mounting means for removably mounting said peripheral module together with the second docking bay module and said second CPU module so that said fourth and fifth pluggable connector means in said second computer assembly are coupled together to connect said disk drive assembly to the logic means in said second CPU module;

means for electrically connecting corresponding network connectors on the rear walls of said first and second docking bay modules, and the first and second CPU modules being interchangeable between said first and second computer assemblies so as to enhance the repair and maintenance capabilities of the computer network.

* * * * *

UNITED STATES PATENT AND TRADEMARK OFFICE
CERTIFICATE OF CORRECTION

PATENT NO. : 5,311,397
DATED : May 10, 1994
INVENTOR(S) : Martin H. Harshberger et al.

It is certified that error appears in the above-identified patent and that said Letters Patent is hereby corrected as shown below:

On the title page: Item [56] Reference Cited:should read

--4,734,874  3/1988  Hwang et al. .............364/708--.

Column 9, line 46, "sand" should read --and--.

Column 11, line 15, "all" should read --wall--.

Signed and Sealed this

Sixth Day of September, 1994

Attest:

BRUCE LEHMAN

Attesting Officer  Commissioner of Patents and Trademarks